Figure 1:
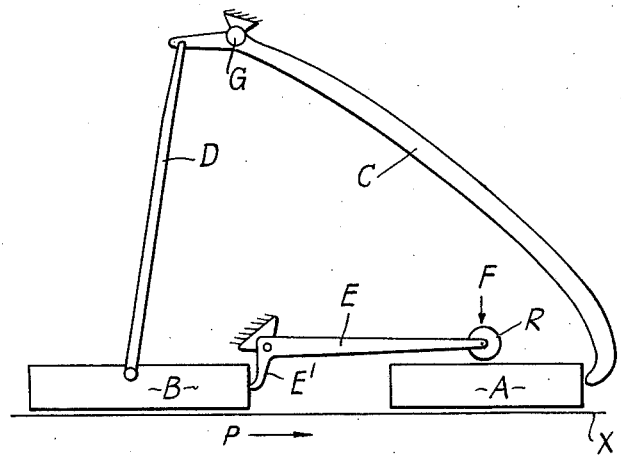

Nov. 10, 1964  D. C. JOHNSON  3,156,322
TWO SHOE SERVO BRAKE

Filed March 23, 1961  2 Sheets-Sheet 1

Nov. 10, 1964  D. C. JOHNSON  3,156,322
TWO SHOE SERVO BRAKE
Filed March 23, 1961  2 Sheets-Sheet 2

INVENTOR
DANIEL C. JOHNSON
BY *Larson and Taylor*
ATTORNEY

United States Patent Office 3,156,322
Patented Nov. 10, 1964

3,156,322
TWO SHOE SERVO BRAKE
Daniel C. Johnson, Leeds, England, assignor to National Research Development Corporation, a corporation of Great Britain
Filed Mar. 23, 1961, Ser. No. 97,845
Claims priority, application Great Britain Mar. 25, 1960
8 Claims. (Cl. 188—78)

This invention relates to brakes, and is particularly concerned with improvements in braking systems for vehicles applicable to brakes of the self-servo type wherein movement of a primary shoe incident to frictional engagement with a drum or other braking surface is utilised to force a secondary shoe or shoes into frictional engagement with the braking surface.

The invention is applicable to brakes of this type wherein shoes of arcuate formation co-operate with a brake drum, as well as to brakes of the disc type wherein the brake shoe is in the form of a pad. The term "brake shoe" used herein, therefore, includes a brake pad, such as used in a disc brake.

The invention has for a primary object to provide an improved brake of the self-servo type which will combine a high $$\frac{\text{drag force on secondary shoe}}{\text{operating force}}$$

ratio with a low rate of change of ratio on occurrence of variations in the coefficient of friction so as to counteract fading effects or "locking." A secondary object is to provide a self-servo brake wherein the distance moved through by the operating force can be so reduced as to make it possible to increase the ratio of operating force to pedal force by a multiplying lever arrangement or equivalent means.

According to the invention, a self-servo brake of the type referred to is provided with means whereby negative feed-back is applied to the operating force on the primary shoe. More specifically, primary and secondary shoes of a self-servo brake are interconnected in such manner that there is a positive servo effect from the primary shoe to the secondary shoe and negative servo effect from the secondary shoe to the primary shoe, the negative feed-back acting in opposition to the operating force on the primary shoe.

The effect of such an arrangement is analogous to an electronic amplifier with negative feed-back which gives stability of output without the gain being excessively small. If this principle is applied to a brake, then the "output" may be taken to be either the torque which the brake exerts, or the deceleration of the member on which the brake acts. If the deceleration of the member on which the brake acts is used to control negative feed-back, then a suitable device must be employed which will provide a force, e.g. a hydraulic pressure, which is proportional to the deceleration and which would be applied so as to act against the operating force on the primary shoe so that the brake would have the characteristic that the ratio of deceleration to operating force could be fairly insensitive, not only to changes in coefficient of friction, but also to gradient and vehicle loading.

The distance moved through by the operating force is a vital factor in brake performance inasmuch as it is the magnitude of this distance which normally limits the extent to which the operating force can be increased by lever mechanism or other multiplying means. The negative feed-back arrangement according to the invention reduces the distance through which the operating force has to act and so makes it possible to increase the ratio of operating force to pedal force by lever or other multiplying means.

Figure 2:
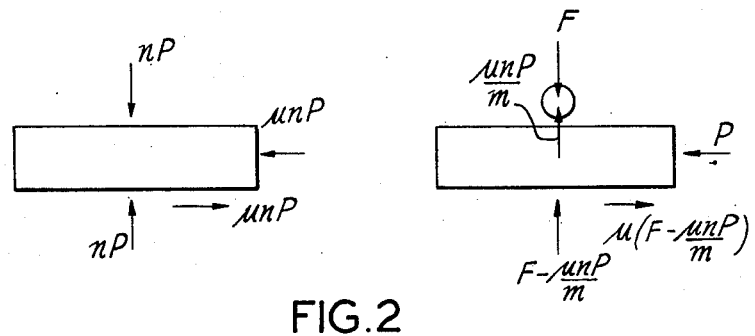
Figure 3:
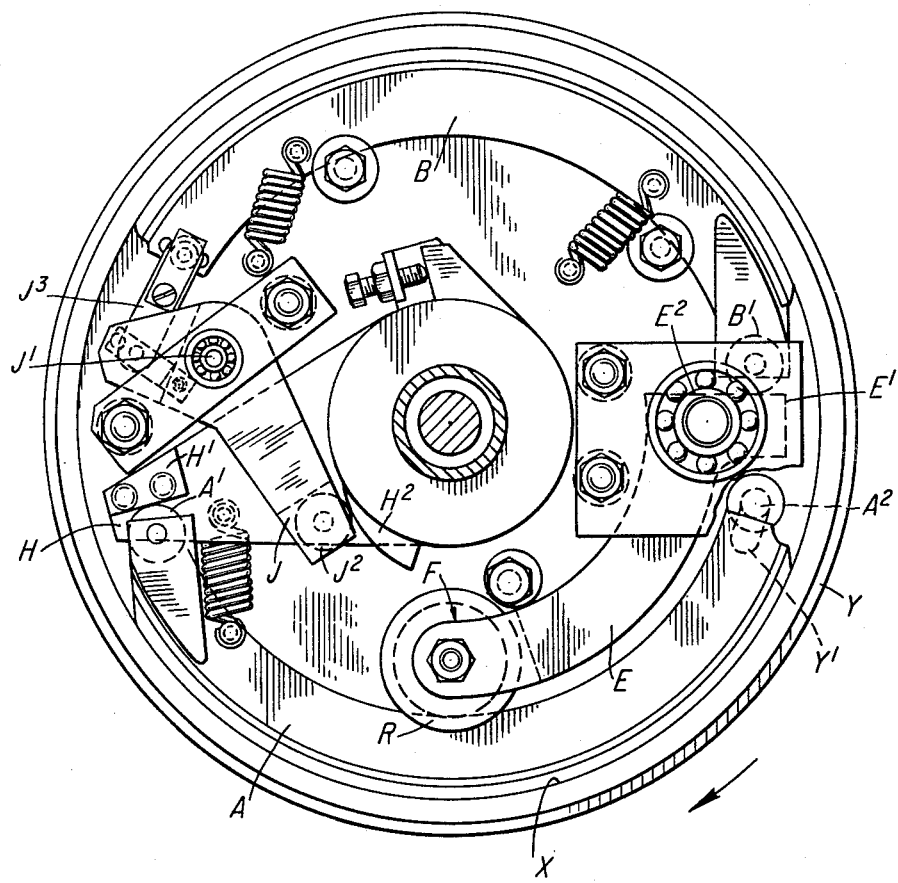

The invention is hereinafter described, by way of example, with reference to the accompanying drawings in which:

FIG. 1 is a diagram illustrating the application of the negative feed-back arrangement by mechanical means;

FIG. 2 is a diagram indicating the forces acting on the primary and secondary shoes; and FIG. 3 is a side elevation illustrating a construction of self-servo two-shoe brake embodying the negative feed-back arrangement shown in FIG. 1, Referring to FIG. 1 of the drawings, a primary shoe A is pressed against a braking surface X by an operating force F acting through a roller R so that the primary shoe A is displaceable to the right by frictional drag P. This movement of the primary shoe A acts to swing the bell-crank lever C anti-clockwise about a pivot G and force is applied from the lever C by means such as a link D, to the secondary shoe B to press the shoe B into engagement with the braking surface X. Drag on the secondary shoe B displaces it to the right and this motion is resisted by a vertical arm E' of a bell-crank lever E, the horizontal arm of which carries the roller R.

The forces acting on the shoes are shown in FIG. 2. The ratio of the vertical to the horizontal moment arm of the bell-crank lever C is taken to be $n$ and that of the horizontal arm to the vertical arm of the bell-crank lever E is $m$. The condition for equilibrium of the primary shoe is:

$$P = \mu\left(F - \frac{\mu n P}{m}\right)$$

from which $$P = \frac{\mu F}{1 + \mu^2 \frac{n}{m}}$$

The ratio of $$\frac{\text{drag on secondary shoe}}{\text{operating force}}$$

is given by $$\frac{\mu n P}{F} = \frac{\mu^2 n}{1 + \mu^2 \frac{n}{m}}$$

which may be written $$\frac{\mu n P}{F} = \frac{n}{\frac{1}{\mu^2} + \frac{n}{m}}$$

Now $\mu$ may be taken as 0.3 as a representative value so that $1/\mu^2$ is about 11. If the brake is to be fairly insensitive to changes in $\mu$ then $n/m$ will have to be, say, 20. However, $$\frac{\mu n P}{F}$$

must, if the device is to be useful, be appreciably greater than the corresponding ratio for a simple brake without feed-back, and for such a brake the ratio of $\mu$. If $$\frac{\mu n P}{F}$$

is made equal to 1.5—a gain of 5 over the simple brake—then $$1.5 = \frac{n}{11 + 20}$$

this gives $n = 46.5$ and hence $m = 2.32$.

With these constants an increase of $\mu$ from 0.30 to 0.35 will be found to raise $$\frac{\mu n P}{F}$$

from 1.495 to 1.595. This is about a 7% increase for a 17% increase in $\mu$. The brake is therefore 2½ times less $\mu$ sensitive than a simple brake without feed-back yet requires only one-fifth of the operating pressure. Furthermore, the distance through which the operating force has to act is so reduced as to make it possible to increase the ratio of operating force to pedal force by a multiplying lever, or equivalent means. If, in the above example, the elastic stiffness of the primary shoe and drum is $\lambda$, then the distance moved through by the operating force will be $$\frac{F - \frac{\mu n P}{m}}{\lambda}$$

Taking the figures corresponding to $\mu=.3$, this gives $$\frac{F\left(1 - \frac{1.495}{2.32}\right)}{\lambda} = .355 \frac{F}{\lambda}$$

whereas without feed-back the distance would be $F/\lambda$. Thus, the feed-back reduces the distance moved to about one-third of the value which it would have in a single shoe brake.

In a practical application of the negative feed-back arrangement above described, as shown in FIG. 3, operating force is applied to a primary shoe A by means such as a hydraulic piston and cylinder unit acting in the direction of the arrow on a lever E and thence through a roller R to the primary shoe A. Assuming that the drum Y rotates clockwise, the primary shoe A when forced into engagement with the braking surface X of the drum Y, will be displaced clockwise by cooperation of the shoe pin $A^2$ in the drum slot $Y^1$. Roller $A'$ on the end of the shoe A engages an abutment $H'$ on a lever H mounted to swing about the axis of the drum Y and provided with a cam $H^2$. The cam $H^2$ acts on a roller $J^2$ carried by a bell-crank lever J pivoted at $J'$ acting on the leading end of the secondary shoe B through a link $J^3$. At the trailing end the shoe B is provided with a roller $B'$ which engages with a short arm $E'$ of the bell-crank lever E pivoted at $E^2$.

It will be seen that on application of operating force F as indicated, the primary shoe A will act through the lever H, cam $H^2$, roller $J^2$ and lever J to force the secondary shoe B into contact with the braking surface X of the drum Y with servo action. Resulting drag on the secondary shoe B tends to displace it clockwise and thus, a negative feed-back force is applied through the roller $B'$ and lever E in opposition to the force F.

The high value of $n$ implies that the primary shoe will move through an appreciable distance when the brake operates, and the mechanical design must allow for this. One possibility is for the primary shoe to bear against a separate surface which, since the pressure would not be high, need not have any special cooling facilities; the main drum would then be left clear for, perhaps, a pair of secondary shoes. Some form of damper may have to be included to counteract oscillation.

It will be understood that the invention is not limited to the particular embodiment hereinbefore described.

Variations obvious to those skilled in the art can be resorted to without departing from the spirit of the invention described or the scope of the subjoined claims.

I claim:

1. A self-servo two-shoe brake comprising a brake drum having an internal braking surface, a primary shoe displaceable circumferentially in the direction of rotation of the drum by frictional drag under the influence of a force applied to the primary shoe to cause it to engage the braking surface, a secondary shoe displaceable in the direction of movement of the braking surface, a mechanism operable by displacement of the primary shoe and acting on the secondary shoe to force said secondary shoe into engagement with the braking surface, and means operable by displacement of the secondary shoe for applying a negative feed-back in opposition to the operating force on the primary shoe, the said means operable by displacement of the secondary shoe including a double-armed lever member having a short arm with which the secondary shoe coacts, and a longer arm which extends substantially to a mid point of the primary shoe, the force exerted on the primary shoe being applied in a radial direction through said longer arm of the double-armed lever member and the pressure exerted by the secondary shoe on the shorter arm thereof exerting a negative feed-back acting through the longer arm in opposition to the operating force on the primary shoe.

2. A self-servo two-shoe brake according to claim 1 wherein the mechanism operable by displacement of the primary shoe comprises a first lever member pivoted about the axis of rotation of the drum and pivoted in response to the circumferential displacement of the primary shoe, the first lever member including a cammed surface eccentric to the axis of pivoting of the first lever member; and a second movable lever member cooperating with said cammed surface and operatively connected to the secondary shoe for transmission of movement thereto.

3. A self-servo brake comprising a braking surface, a primary brake shoe and a secondary brake shoe, each having means for frictionally engaging the braking surface during a braking action and displaceable in the plane of the braking surface under the influence of frictional drag while exerting the braking action, an application member operable by a gross operating force to apply a braking action force to the primary shoe to frictionally engage the braking surface, the primary shoe being thereby relatively displaced in the plane of the braking surface, means disposed between the application member and the primary shoe permitting the relative displacement of the primary shoe under the frictional drag while preventing such displacement from causing mechanical work to be done by the operating force on the primary shoe, a force multiplying device operable by the displacement of the primary shoe under frictional drag to apply a braking force to the secondary shoe for frictionally engaging the braking surface, and a linkage device operable by displacement of the secondary shoe during application of the braking force to the secondary shoe for applying to the application member a force acting as negative feed-back in opposition to the gross operating force to produce a net operating force applied by the application member to the primary shoe, the force multiplying device applying the secondary shoe braking force including means to produce a resultant secondary shoe force acting on the braking surface substantially greater than the corresponding resultant primary shoe force acting on the braking surface and produced by the net operating force on the primary shoe.

4. A self-servo two-shoe brake comprising a brake drum having an internal braking surface, an application member, a primary shoe displaceable circumferentially in the direction of rotation of the drum by frictional drag under the influence of an operating force applied to the primary shoe by the application member to cause the primary shoe to engage the braking surface, means disposed between the application member and the primary shoe to permit relative displacement of the primary shoe and to prevent such displacement from causing mechanical work to be done on the primary shoe by the application member, a secondary shoe displaceable in the direction of movement of the braking surface, a force multiplying mechanism operable by displacement of the primary shoe and acting on the secondary shoe to force said secondary shoe into engagement with the braking surface, and a linkage device operable by displacement of the secondary shoe for applying a negative feed-back force in opposition to the operating force exerted on the primary shoe by the application member, the force multiplying mechanism forcing the secondary shoe into engagement with the braking surface including means to produce a resultant secondary shoe force acting on the braking surface substantially greater than the corresponding resultant primary shoe force acting on the braking surface.

5. A self-servo two-shoe brake according to claim 4 wherein the force multiplying mechanism and including producing means comprises a first lever member pivoted about the axis of rotation of the drum in response to displacement of the primary shoe; a cam on the first lever member; a movable second lever including means engaging the cam for movement in response to pivoting of the first lever member; and link means for transmitting the movement of the second lever to the second shoe.

6. A self-servo two-shoe brake according to claim 4, wherein the linkage device comprises a double-armed lever member, said lever member having a short arm with which the secondary shoe coacts, and a longer arm which coacts with the primary shoe, the operating force exerted on the primary shoe being applied in a radial direction through said longer arm of the double-armed lever member and the feed-back force exerted by the secondary shoe on the shorter arm thereof exerting a negative feed-back acting through the longer arm in opposition to the force exerted on the primary shoe by the application member.

7. A self-servo two-shoe brake according to claim 4, wherein the means disposed between the application member and the primary shoe comprises a roller rotatably mounted on the application member and peripherally in contact with a surface of the primary shoe.

8. A self-servo two-shoe brake according to claim 4 wherein the mechanism operable by displacement of the primary shoe and included producing means comprises a first lever mounted for rotation about an axis common with the axis of rotation of the brake drum and having a cam surface eccentric to the said axis of rotation, the lever arm operatively engaging the primary shoe for rotation in response to displacement of the primary shoe; and a bell crank mounted for rotation about an axis displaced from the axis of rotation of the first lever, the bell crank operatively engaging the cammed surface of the first lever for movement in response to rotation of the first lever; and linked means for transmitting movement of the bell crank to the secondary shoe.

References Cited in the file of this patent
UNITED STATES PATENTS

| | | |
|---|---|---|
| 1,804,929 | Girling | May 12, 1931 |
| 1,910,451 | Taylor | May 23, 1933 |
| 3,047,099 | Dahle | July 31, 1962 |